United States Patent [19]

Jerry et al.

[11] 3,825,700
[45] July 23, 1974

[54] ARTICULATED HEARING AID TEMPLE AND BEHIND-THE-EAR HEARING AID ELEMENT

[75] Inventors: Albert Jerry, Elmsford; Jasper Baum, White Plains, both of N.Y.

[73] Assignee: Sonotone Corporation, Elmsford, N.Y.

[22] Filed: Mar. 2, 1973

[21] Appl. No.: 337,628

[52] U.S. Cl............................................. 179/107 S
[51] Int. Cl.............................................. G02c 11/06
[58] Field of Search.......... 179/107 S, 107 E, 107 H

[56] References Cited
UNITED STATES PATENTS

| | | | |
|---|---|---|---|
| 2,720,559 | 10/1955 | Thomas | 179/107 S |
| 3,091,020 | 5/1963 | Strzalkowski | 179/107 S |
| 3,285,688 | 11/1966 | Wieszeck | 179/107 S |
| 3,382,327 | 5/1968 | Bowes | 179/107 S |
| 3,431,370 | 3/1969 | Crosby | 179/107 S |

Primary Examiner—Ralph D. Blakeslee

[57] ABSTRACT

A temple piece hearing aid for eyeglasses in which the temple piece comprises two sections, one in front of the ear connectible to a hinge stub on the eyeglass frame and a second behind the ear; the two sections are hingedly connected for universal movement and adjustment of the behind the ear section with respect to the front section, the hinge connection being of a "stay-put" type or similar construction having a tubular passage adapted to pass a sound tube and circuit connecting elements therethrough in a protective fashion; thereby permitting the temple piece sections to be made of any useful or desired material and obviating the prior limitation of the use of a thermoplastic casing with an over-the-ear section which required heat treatment, with attendant possible deleterious effects of heat, for adjustment.

3 Claims, 9 Drawing Figures

PATENTED JUL 23 1974     3,825,700
SHEET 1 OF 2
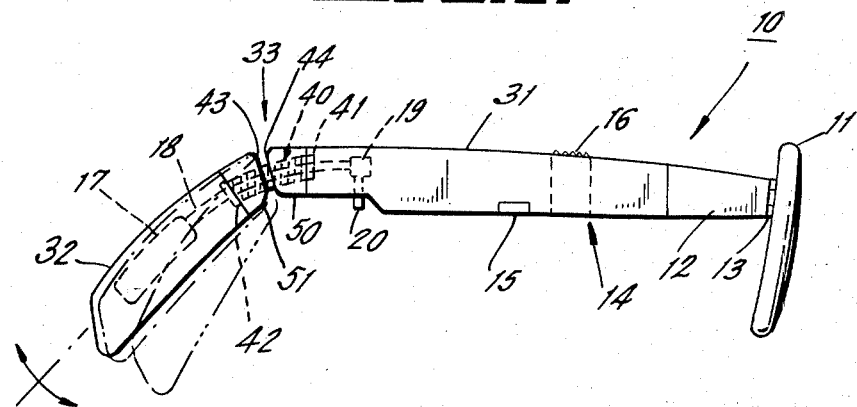
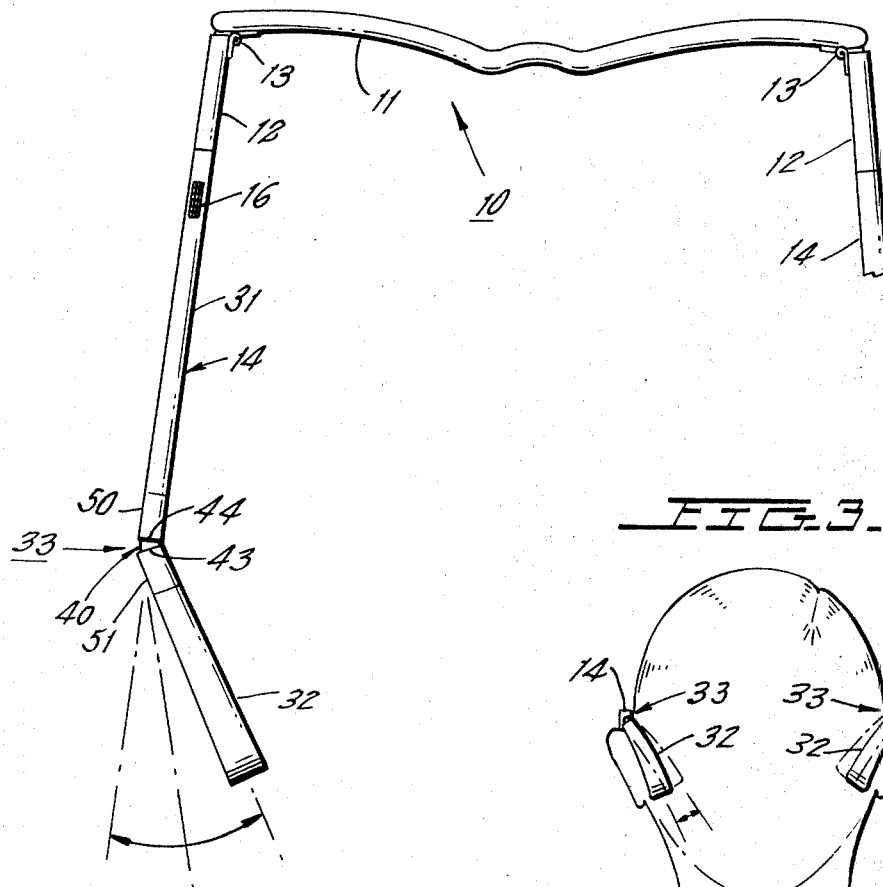
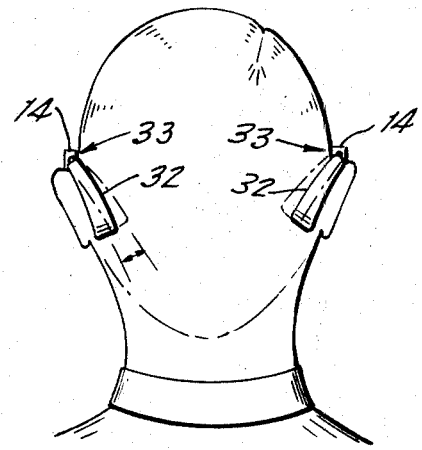

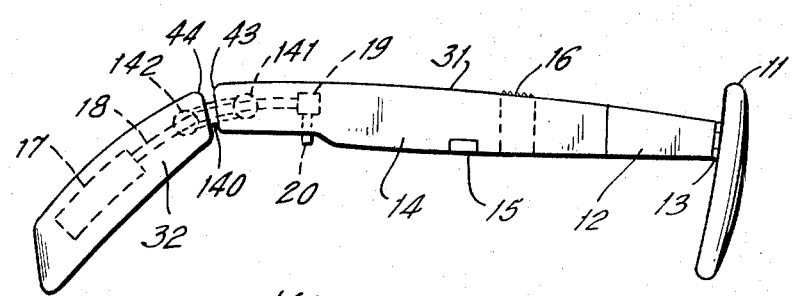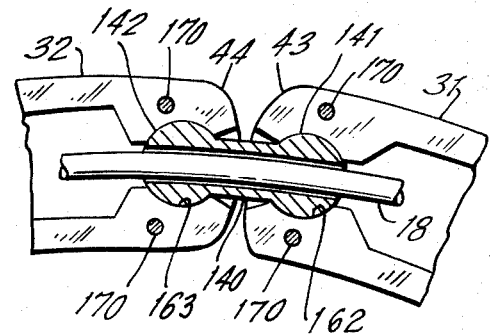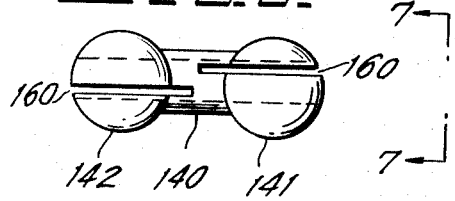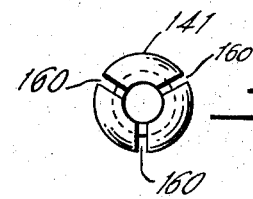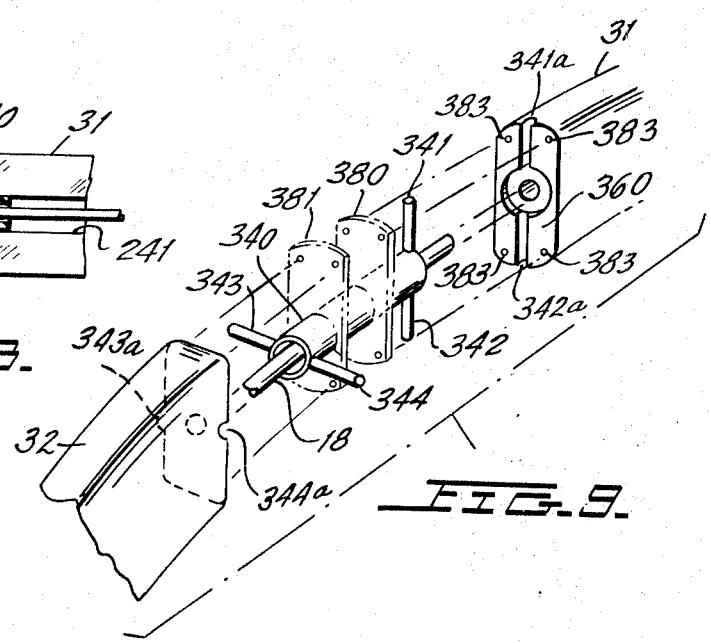

ARTICULATED HEARING AID TEMPLE AND BEHIND-THE-EAR HEARING AID ELEMENT

The present invention relates to eyeglass hearing aids and more particularly to an eyeglass hearing aid in which a substantial portion of the hearing aid structure is in the portion of one of the temple pieces of the eyeglasses which extends behind the ear.

The present invention is specifically directed to the arrangement of the portion of the hearing aid temple piece which extends behind the ear so that it is hingedly connected to the remainder of the temple piece in order that it may readily be adjusted to the appropriate angle both vertically and horizontally and may therefore be rotated universally to obtain the proper adjustment while at the same time, once the adjustment is achieved, the adjusted position will be maintained. The user may however readjust the setting from time to time as required under different conditions or in the event that, owing to some accident such as the falling of the glasses, readjustment is required.

In the construction of eyeglass hearing aids it is customary to manufacture the temple pieces which carry the hearing aid in a single general straight form so arranged that it may be bent by a fitter or optician to the desired angle. This obviates the need for making right and left hearing aids. The temple piece is usually provided with a small extension attached to the spectacle frame itself so that it may be removably mounted thereon.

However the construction of the temple piece in prior hearing aids is such that, in order to permit the fitter of the hearing aid to adjust the element to the physical contours of the particular user the single casing of the entire temple piece is made of a plastic material which may, when subjected to heat be readily flexed. The problem which arises is that the temple piece also contains various delicate components including a microphone, a speaker, battery case and contacts and an amplifier which when used in solid state condition is an exceedingly delicate member which may readily be thermally damaged. Therefore it has become customary to arrange the various elements within the temple piece so that no operating member is present at flexure point which may be subjected to heat.

Usually the microphone opening is forward of the bend over the ear and the battery compartment is also usually located forward of the bend of the ear. The amplifier elements and the speaker are frequently placed in the portion of the unit behind the ear. An electrical connection is made from the microphone to the amplifier elements and the battery; and a tube is provided within the temple piece from the speaker which is connected to the amplifying elements back to a nipple forward of the ear to which another tube may be connected to an ear mold in the ear. Thus it has become necessary to design such temple pieces so that only the tube connections pass through the flexure point. If, during flexing, the tube is pinched then the hearing aid temple piece is ruined.

The present invention contemplates the utilization of a hinged connection between the behind-the-ear section and the remainder of the temple piece wherein the hinged connection consists of a rigid or rigidified tubular member which will permit flexing and positioning of the section of the temple piece behind the ear with respect to the remainder of the temple piece while maintaining substantially the concentricity of the tube so that the speaker tube will be fully protected and that any wires or circuit connections which must pass from in the section in front of the ear to the section behind the ear will also be fully protected.

A primary object of this invention therefore is to provide a protecting hinge between the side element and the behind-the-ear element of an eyeglass hearing aid temple piece so that the behind-the-ear element may readily be adjusted and set to the contour of the particular user while at the same time the speaking tube and circuit elements which may be required to pass from one section of the temple piece to the other are also fully protected.

Further objects of this invention include the utilization of a flexible resettable connection which nevertheless protects the speaking tube and other circuit elements as well as a rigid member which may be hingedly connected to either or both of the behind-the-ear element and the remaining portion of the temple piece to provide for the same type of adjustment while nevertheless protecting the elements of the hearing aid.

A still further and important object of the invention, while it is a negative one, is nevertheless the particular object which outstandingly makes the present invention necessary—that is, with the utilization of such a connector which permits the hinging of the behind-the-ear section to the remainder of the temple piece of the eyeglass hearing aid, complete freedom is provided to the manufacturer in the use of the proper materials for the entire temple piece of the hearing aid, which will fully protect the hearing aid since it is no longer necessary to utilize thermoplastic material of a particular type for the hearing aid in order to permit adjustment by heat treatment by the fitter or optician who may do the fitting job.

The foregoing and many other objects of this invention will become apparent in the following description and drawings in which:

FIG. 1 is a side view of an eyeglass hearing aid showing the utilization of a flexing connector between the behind-the-ear section and the remaining section of the temple piece of the eyeglass hearing aid, such flexing connector nevertheless maintaining a tubular cross-section throughout its length in any position to which it may be flexed thereby protecting any of the elements which must pass through the connector. FIG. 1 shows the ability of the unit to be adjusted vertically in order to accommodate itself to the particular line required by the user from the back of his ear to the temple piece of the eyeglasses.

FIG. 2 is a top view of the eyeglass hearing aid of FIG. 1 showing the ability of the unit also to be adjusted horizontally with respect to the head of the user.

FIG. 3 is a view of the rear of the head of the user showing the temple piece and eyeglass hearing aid mounted on his head demonstrating the range of adjustment of the device.

FIG. 4 is a view of an alternate temple piece utilizing a connecting rigid tube and ball elements at the end of the tube extending into mating sockets within the side portion of the temple piece and the ear portion.

FIG. 5 is a cross-sectional view of the structure of FIG. 4 showing a method of retention of the ball and socket hinge piece of FIG. 4.

FIG. 6 is a side view of the connector element itself showing particularly slots therein which facilitate the arrangement of a friction fit between the ball ends of the connector piece and the elements of the temple piece.

FIG. 7 is an end view taken from line 7—7 of FIG. 6 looking in the direction of the arrows.

FIG. 8 is a longitudinal section showing a modified form of the ball and socket joint wherein a single ball may be used although the same modified structure may be utilized with balls at either end.

FIG. 9 is a view in perspective of another modified form of connector showing the utilization of essentially a universal joint type of connection with a vertical pair of hinges and horizontal pair of hinges to achieve the same results.

Referring first to FIGS. 1, 2, and 3, the eyeglass hearing aid 10 is provided with a spectacle frame 11 which will of course support the lenses and a short stub hinge element 12 connected by the hinge 13 on each side to the eyeglass frame. As is customary in the operation of hearing aids, the temple piece 14 is removably and replaceably mounted in any suitable manner on the hinge piece or stub 12. The hearing aid itself consists of the removable temple piece 14 which is usually provided with a microphone opening 15, a battery compartment 16, an amplifier and speaker section 17 and a tube 18 leading from the amplifier and speaker section 17 to a support 19 for a nipple 20. The nipple 20 may then be connected to another external tube which is fitted into the ear or which has at its other end an ear mold which may be placed in the ear.

The temple piece 14 is provided with a forward or temple casing 31 and a behind the ear casing 32. Heretofore it has been customary in the hearing aid art to make the entire temple piece 14 a single unit and to make the casing of the temple piece 14 of thermoplastic material so arranged that it may be flexed by a fitter or optician in the general area 33. For this reason the materials which have been available for use for the housing of the temple piece 14 have been limited in order to permit the utilization of heat at the flex area 33, while nevertheless preventing conduction of heat and any deleterious effect of the impingement of heat on the operating elements of the hearing aid. The only elements therefore permitted at the flex section 33 were the speaker tube 18 and any wires which might have to pass between the sections 31 and 32 in order to complete the circuits. In such cases the wires had to be treated, coated or protected against the heat which would be necessary in order to obtain the flex desired to accommodate the hearing aid unit to a particular user. While such heat was not necessarily high it nevertheless has been of the level of heat usually available to a fitter or optician, of the order of 180° to 200°F. Such level of heat was required to be concentrated at the flex position 33 and of course would have a deleterious effect on the more delicate elements of the internal portions of the hearing aid if conducted thereto.

Consequently the fitting was required to be done with a great deal of finesse and skill and, especially, by utilization of heat concentrated at a particular location. Such fittings are normally done in the field by a variety of persons who profess a variety of different skills. Damage to the hearing aid unit at times occurred.

In accordance with one form of the present invention as shown in FIGS. 1, 2, and 3, a "stay-put" flexible spiral tube 40 is provided, having an anchoring collar 41 at one end and an anchoring collar 42 at the other end. Such stay-put types of flexible tubing are well known and are typically produced by helically winding a continuous metal strip with both edges interlocked and packed to form an interlock joint at each of the turns of the spiral. Such stay-put type of tubing allows the tubing to remain in whatever position it is moved to and permits movement in all directions. The utilization of the stay-put tube 40 in the structure of FIGS. 1 to 3 provides for a hinging between the behind-the-ear casing 32 and the forward casing 31 in a limited degree as determined by spacing of the facing surfaces 43 of the casing 32 and 44 of the casing 31. The hearing aid tube 18 from the amplifier speaker assembly 17 leading to the nipple support 19 and the nipple 20 is fully protected within the stay-put tube 40. As will be seen from FIGS. 1, 2, and 3, the movement of the hearing aid casing 32 with respect to the remainder of the temple piece 31 is universal, both up and down and sideways and angularly, and may thus readily be adjusted to the head of the user.

The collars 41 and 42 may be appropriately anchored in the casings 31 and 32 respectively. If it is desired to arrange the elements so that removal of either of them may be easily obtained, the rear end 50 of the temple section 31 may be made removable at the collar portion 41 and the forward end 51 of the casing 32 may similarly be made removable so that the rear section 32 of the temple piece may be removed from the forward end 31 of the temple piece 14 for replacement and repair; of course appropriate securing means may be used which is obvious to those skilled in the art such as an adhesive at the joints between elements 50 and 31 and elements 51 and 32 which on the appropriate application of heat will become nonadhesive; or any appropriate fastening means may be used.

By this means it will be seen that a universal adjustment may be obtained for a behind the ear hearing aid, the adjustment itself being limited by the distance between the facing surfaces 43 and 44 of elements 32 and 31 of the temple piece 14 while nevertheless the adjustment is completely universal and permits a comfortable setting for the hearing aid units. By this means also it is no longer necessary to utilize any particular type of thermoplastic material for the casing of the temple piece 14; but any appropriate material may be used including material which will more readily protect all of the hearing aid elements contained therein than is presently the case with the type of thermoplastic material which is necessarily used in connection with the hearing aid elements.

One of the primary functions of the tube 40 in addition to providing for this flexible connection is to contain the speaking tube 18 and wires or other circuit elements which must pass between the casing 32 and the casing 31 of the temple piece 14 in order to complete the hearing aid circuit. Since the stay-put material of the tube 40 may be selected to have any desired rigidity requiring a selected force in order to make the adjustment, the adjustment which will be made is permanent in the sense that it will be retained as long as the user desires the adjustment to be so retained and may be moved by him to a new adjustment should that be required.

The basic concept already disclosed may be performed in another way as shown in FIGS. 4, 5, 6, and 7. In this case the connecting tube 140 is essentially dumbbell shaped, having hollow balls 141 connectible to the section 31 of the temple piece and 142 connectible to the behind-the-ear section 32 of the temple piece. The element 140 in this case may be plastic or metal, with the hollow ball sections being resiliently compressible, as for instance by the placement of slots 160 therein. Each of the sections 31, 32 of the hearing aid as shown in FIG. 5 may be provided at its facing ends 43, 44 with sockets 162, 163 into which the balls 140 and 141 may resiliently be forced and retained. The friction at these sockets is selected to be such that the casing section 32 will remain set in whatever position it is placed with respect to the casing section 31. As shown also the hearing tube 18 may then pass through the tubular dumbbell-shaped member 140; and other connecting wires or elements of the hearing aid may also pass through such dumbbell-shaped tube. By this means, therefore, the members 32 and 31 may be rotated universally with respect to each other within the limitations imposed by the spacing of the surfaces 43 and 44 of casings 32 and 31 in order to obtain an adjusted and set position. The friction chosen for the ball and socket joints will be such as to permit adjustment by a fitter or user while nevertheless permitting the casing 32 and casing 31 to remain in a preset position chosen by the fitter or user until a new position is desired.

It is obvious that in the structure of FIGS. 1 to 3 as well as the structures of FIGS. 4 to 7 where longitudinally split casings are used for the housings 31 and 32 they may be flexibly joined simply by laying in the connecting tubular member and then completing the casing by placing the cover thereon. In FIG. 5 pins 170 for completing the casings are indicated. However, the casings may be permanently sealed where it is deemed to be desirable.

In FIG. 8 there is shown another type of structure corresponding somewhat to that of FIGS. 4 to 7 in which the connecting tube 240 is secured in any suitable manner in a tubular opening 241 of the temple piece casing 31 while the opposite end of the connecting tube 240 is provided with a ball 242 which is connected into a socket 243 of casing 32.

The tube 240 may be a plastic material and may also be of other material. The essential element of this particular construction is that the material 245 at the socket 243 of the casing has a characteristic such that it will, on the application of heat, expand more than the material of the tube 240, and consequently on the withdrawal of heat it will contract more rapidly. The ball 242 is made of a diameter so that on the application of a selected degree of heat it will be able to enter the socket 243 readily and on the withdrawal of such heat and the return of the unit to substantially ambient temperatures the material 245 defining the socket 243 will shrink around the ball 242, thereby providing a substantial friction fit. This, therefore, permits the casing 32 to be rotated with respect to the ball 242 in all planes to provide the adjustment and to remain set in a selected position. It will be obvious that the same type of operation may be utilized in connection with the structures of FIGS. 4 to 7. It will also be obvious that the tube 18 and other hearing aid elements may pass through the single ball tube 240.

In FIG. 9 there is shown a modification of the structure wherein essentially a universal joint is used consisting of a tube 340 having a pair of vertical pins 341, 342 at one end and a pair of horizontal pins 343, 344 at the other end. The rear end of casing 31 is vertically slotted at 341a, 342a and the forward end of the behind the ear section 32 is similarly horizontally slotted at 343a and 344a so that the respective pins may be received therein. The slots 341a, 342a on the one hand and 343a, 344a on the other hand may be slotted slightly over center so that the pins 341 and 342 as well as the pins 343 and 344 may be a snap fit therein. If desired a cover plate 380 may be secured over the rear face 360 of the hearing aid section 31 and a similar cover plate 381 may be secured over the face 361 of the hearing aid section 32 in order to retain the pins 341—4 in position. Such plates 380, 381 may be adhesively secured or may be secured by pins or screws 383 as shown. By this means therefore the section 31 of the hearing aid unit is rotatable in a horizontal plane with respect to the coupling tube 340 and section 32 of the hearing aid unit is rotatable in a vertical plane with respect to the coupling 340 thereby providing for a universal adjustment. It will be obvious also that the hearing tube 18 and other circuit elements if desired may pass through the universal adjustment tube 340.

In the foregoing the present invention has been described in connection with illustrative embodiments thereof. Since many variations and modifications of the invention will now be obvious to those skilled in the art it is preferred that the scope of this disclosure be limited not by the specific disclosures herein contained but only by the appended claims.

The embodiments of the invention in which an exclusive privilege or property is claimed are defined as follows.

1. A temple piece for an eyeglass hearing aid comprising a first section adapted to be worn in front of the ear and a second section adapted to be worn behind the ear;

a connector between the said first section and said second section;

said connector having a tubular passage extending between said first section and said second section;

said sections being universally movable with respect to each other at said tubular connector;

means for restricting the movement of said sections with respect to each other including:

the spacing of adjacent surfaces of said first and second sections to permit said surfaces to meet when the second section is moved through a predetermined angle with respect to said first section; and mechanical resistance to angular movement of the second section with respect to the first section permitting the second section to be moved angularly with respect to the first section on the application of a predetermined force and preventing such movement on the application of any force less than the predetermined force;

said first section having certain hearing aid elements and the second section having other hearing aid elements; connecting means extending between the hearing aid elements in the said first and second sections; said connecting means passing through said tubular passage of said connector;

said connector comprising a helical coil of tape, with each turn of the tape being substantially rigid; the said helical coil forming a tube; said tube being universally bendable on the exertion thereon of a predetermined force and having a stay-put characteristic; said tube retaining its bent position against any force thereon less than said predetermined force.

2. A temple piece for an eyeglass hearing aid comprising a first section adapted to be worn in front of the ear and a second section adapted to be worn behind the ear;
- a connector between the said first section and said second section;
- said connector having a tubular passage extending between said first section and said second section;

said sections being universally movable with respect to each other at said tubular connector;
means for restricting the movements of said sections with respect to each other including:
the spacing of adjacent surfaces of said first and second sections to permit said surfaces to meet when the second section is moved through a predetermined angle with respect to said first section; and mechanical resistance to angular movement of the second section with respect to the first section permitting the second section to be moved angularly with respect to the first section on the application of a predetermined force and preventing such movement on the application of any force less than the predetermined force;
said first section having certain hearing aid elements and the second section having other hearing aid elements; connecting means extending between the hearing aid elements in the said first and second sections; said connecting means passing through said tubular passage of said connector;
said connector terminating in a ball, the said tubular passage continuing through said ball; and one of said sections is provided with a socket at the portion thereof adjacent the connector, said ball being a friction fit in said socket; the other end of said tubular connector being connected to the other section.

3. The temple piece for an eyeglass hearing aid of claim 2 wherein both ends of the connector terminate in a ball; the tubular passage extending through each ball; and each section is provided with a socket at the portion thereof adjacent the connector; said balls being a friction fit in the respective sockets.

* * * * *